United States Patent [19]

Curry

[11] Patent Number: 5,710,636
[45] Date of Patent: Jan. 20, 1998

[54] METHOD AND APPARATUS FOR GENERATING HALFTONE IMAGES HAVING HUMAN READABLE PATTERNS FORMED THEREIN

[75] Inventor: Douglas N. Curry, Menlo Park, Calif.

[73] Assignee: Xerox Corporation, Stamford, Conn.

[21] Appl. No.: 462,283

[22] Filed: Jun. 5, 1995

[51] Int. Cl.⁶ ........................................ H04N 1/405
[52] U.S. Cl. ........................ 358/298; 358/456; 358/459
[58] Field of Search ........................ 399/366; 358/298, 358/296, 456, 458, 459

[56] References Cited

U.S. PATENT DOCUMENTS

| | | | |
|---|---|---|---|
| 4,168,088 | 9/1979 | Somlyody | 283/8 R |
| 4,310,180 | 1/1982 | Mowry, Jr. et al. | 283/8 R |
| 4,582,346 | 4/1986 | Caprio et al. | 355/133 |
| 4,692,603 | 9/1987 | Brass et al. | |
| 4,728,783 | 3/1988 | Brass et al. | |
| 4,754,127 | 6/1988 | Brass et al. | |
| 4,782,221 | 11/1988 | Brass et al. | |
| 5,018,767 | 5/1991 | Wicker | 283/67 |
| 5,091,966 | 2/1992 | Bloomberg et al. | |
| 5,171,040 | 12/1992 | Orndorff | 283/93 |
| 5,315,098 | 5/1994 | Tow | |
| 5,337,361 | 8/1994 | Wang et al. | |
| 5,374,976 | 12/1994 | Spannenburg | 355/201 |
| 5,410,414 | 4/1995 | Curry | |
| 5,487,567 | 1/1996 | Volpe | 283/72 |
| 5,579,457 | 11/1996 | Hall | 395/132 |
| 5,583,660 | 12/1996 | Rylander | 358/456 |

Primary Examiner—Peter S. Wong
Assistant Examiner—Derek J. Jardieu
Attorney, Agent, or Firm—Oliff & Berridge

[57] ABSTRACT

An apparatus and method for producing a halftone image generates halftone cells based on grayscale image data and bitmap code. A human readable pattern is embedded within the halftone image. Each of the halftone cells is formed from dot patterns having one of a plurality of predetermined shapes. The predetermined shapes of the halftone cells form the human readable pattern. The halftone cells are written onto a recording medium to produce the halftone image. Rotation of the halftone cells allows data to be encoded within each of the halftone cells without varying the tone of the image. The tone of the image may be controlled by selectively varying a thickness of the dot patterns within the halftone cells.

18 Claims, 6 Drawing Sheets

METHOD AND APPARATUS FOR GENERATING HALFTONE IMAGES HAVING HUMAN READABLE PATTERNS FORMED THEREIN

FIELD OF THE INVENTION

The present invention relates to devices and methods for producing halftone images, and, more particularly, to devices and methods for producing such halftone images having human readable patterns embedded within the halftone images.

BACKGROUND OF THE INVENTION

Halftoning is a well-known and widely utilized technique for imparting a grayscale appearance to dual tone renderings of variably shaded monochromatic images (e.g., black and white images) and to dual tone color separations of variably shaded polychromatic images. It originated as an optical analog process for imparting a grayscale appearance to dual tone reproductions of continuous tone monochromatic images, but it since has been extended to provide digital halftoning processes that can be utilized by digital document processors for imparting a grayscale appearance to dual tone representations of variably shaded, scanned-in digitized images and to dual tone representations of variably shaded, computer generated synthetic images. These digitally defined images may be monochromatic or polychromatic, so it is to be understood that digital halftoning can be applied for imparting a grayscale appearance to printed and displayed renderings of monochromatic and polychromatic images.

The functional utility of plain paper and other types of hardcopy documents can be enhanced significantly if the human readable information that they normally convey is supplemented by adding appropriate machine readable digital data to them. Input scanners can be employed for recovering this machine readable data, so the data can be employed for various purposes during the electronic processing of such documents and their human readable contents by electronic document processing systems, such as electronic copiers, text and graphic image processing systems, facsimile systems, electronic mail systems, electronic file systems, and document and character recognition equipment.

As is known, machine readable digital data can be recorded by writing two dimensional marks on a recording medium in accordance with a pattern which encodes the data either by the presence or absence of marks at a sequence of spatial locations or by the presence or absence of mark related transitions at such locations. The bar-like codes which others have proposed for recording digital data on paper utilize that type of encoding. See U.S. Pat. No. 4,692,603 entitled "Optical Reader for Printed Bit-Encoded Data and Method of Reading Same," U.S. Pat. No. 4,728,783 and U.S. Pat. No. 4,754,127 on "Method and Apparatus for Transforming Digitally Encoded Data into Printed Data Strips," and U.S. Pat. No. 4,782,221 on "Printed Data Strip Including Bit-Encoded Information and Scanner Contrast." Another interesting approach is to encode machine readable digital data in the shapes of the marks of "glyphs" that are written on the recording medium.

Such shape codes are disclosed in U.S. Pat. No. 5,091,966 to Bloomberg et al., the disclosure of which is incorporated herein by reference.

Glyph shape codes have the advantage that they can be designed to have a relatively uniform appearance. For instance, a simple glyph shape code suitably is composed of small slash-like marks that are tilted to the right or left at, say, ±45 degrees for encoding 1's and 0's, respectively. However, in some situations the more or less uniformly gray appearance of such a code may be aesthetically objectionable, and may cause the tone of the image to change upon tilting of the glyph codes.

A system and method for encoding digital data in halftone images is disclosed in U.S. Pat. No. 5,315,098 to Tow, the disclosure of which is incorporated herein by reference in its entirety. In Tow, digital data are encoded in the angular orientation of circularly asymmetric halftone dot patterns that are written into the halftone cells of digital halftone images. The sizes of the halftone dot patterns are modulated in accordance with grayscale data sample values that are provided to define the image. The patterns are modulated so that the average reflectance or transmittance of each of the halftone cells is modulated to provide a more or less standard halftone rendering of the image. By modulating the angular orientation of the halftone dot patterns, digital data is encoded within the halftone image. The digital data can then be read by a machine, as discussed above. However, the modulation of the angular orientation of the halftone dot patterns may disadvantageously affect the tone of the image depending upon the encoded values, which is an undesirable result.

However, none of the above references allow a halftone image to be formed with a human readable pattern formed within the halftone image.

SUMMARY OF THE INVENTION

This invention provides an apparatus and method for generating a halftone image formed from halftone cells. The halftone cells are generated based on bitmap codes and on grayscale image data. The bitmap codes are based upon at least one human readable pattern to be formed within the image. The halftone cells are written onto a recording medium to produce the halftone image with the human readable pattern formed therein.

This invention also provides such an apparatus and method for producing a halftone image by generating halftone cells formed from dot patterns, the halftone cells each having a plurality of sides, end portions of the halftone cells contacting end portions of the dot patterns of an adjacent halftone cell within the halftone image.

The invention further provides a method and apparatus for producing a halftone image by selectively varying a thickness of the dot patterns within the individual halftone cells which make up the halftone image to vary a tone of the image. Additionally, data may be encoded within each of the halftone cells. The data may be encoded by rotating the halftone cells. The rotational position of the halftone cells does not affect a tone of the overall halftone image. Additionally, the encoded data is machine readable.

The present invention provides these and other features in an apparatus for producing a halftone image, the apparatus including a bitmap generator that generates bitmap codes based upon at least one human readable pattern to be formed within the halftone image, a halftone generator for generating halftone cells based on the bitmap codes and based on grayscale image data, the halftone cells being formed from dot patterns, the halftone generator selecting one of a plurality of predetermined shapes for each of the dot patterns. An output device writes the halftone cells on a recording medium to produce the halftone image. The halftone generator varies the tone of the halftone image by selectively varying a thickness of the dot patterns within individual halftone cells. Data may be encoded within the halftone cells by rotating the halftone cells based on encoding data input to the halftone generator. Rotation of the halftone cells does not affect the tone of the image.

BRIEF DESCRIPTION OF THE DRAWINGS

The invention will be described with reference to the following drawings in which like references numerals refer to like elements and wherein.

DETAILED DESCRIPTION OF PREFERRED EMBODIMENTS

Figure 1:
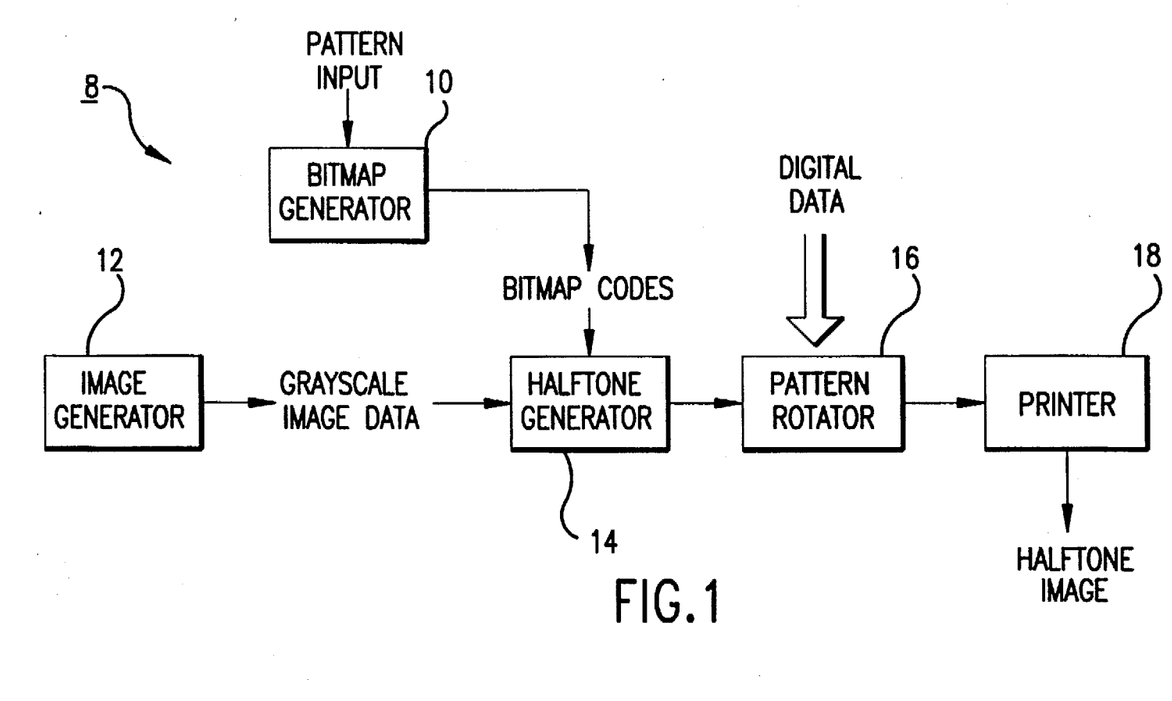
FIG. 1 is a schematic view of an image generating system according to the present invention.

FIG. 1 illustrates an image generation system 8 for producing halftone images according to the present invention. The image generation system 8 includes a bitmap generator 10, an image generator 12, a halftone generator 14, a pattern rotator 16 and a printer 18.

The halftone generator 10 generates halftone cells based on grayscale image data and bitmap codes. The grayscale image data is generated by image generator 12. Image generator 12 may be a device capable of outputting image data, such as a scanner or a computer. The bitmap codes are generated by a bitmap generator 10 based upon a desired pattern to be embedded within the halftone image. The desired pattern may be input to bitmap generator 10 on, for example, a keyboard (not shown) connected to the bitmap generator 10.

The halftone cells generated by the halftone generator 10 are then fed to pattern rotator 12. The pattern rotator 12 is not a necessary component of the present invention and may be omitted. The pattern rotator 12 selectively rotates individual ones of the halftone cells based upon digital data input to the pattern rotator, as shown in FIG. 1. The digital data is data that may be used to encode machine-readable information within the halftone image as disclosed in copending and concurrently filed application Ser. No. 08/463,178 assigned to the assignee of the present application, the disclosure of which is incorporated herein by reference in its entirety. The pattern rotator 12 may be included within the halftone generator 10. The halftone cells are then fed to printer 18, which generates a halftone image based upon the halftone cells.

The halftone image generating system 8 produces halftone images of, for example, scanned in or computer generated synthetic grayscale images. The halftone generator 10 transforms spatially periodic grayscale input image sample values into halftone dot patterns. In keeping with standard practices, these dot patterns are written into a spatially periodic, two-dimensional array of halftone cells. The halftone generator 10 may have a table look-up memory (not shown) that is addressed by the grayscale image sample values and the bitmap codes to retrieve halftone cells that are preprogrammed to contain appropriate dot patterns.

Figure 2A:
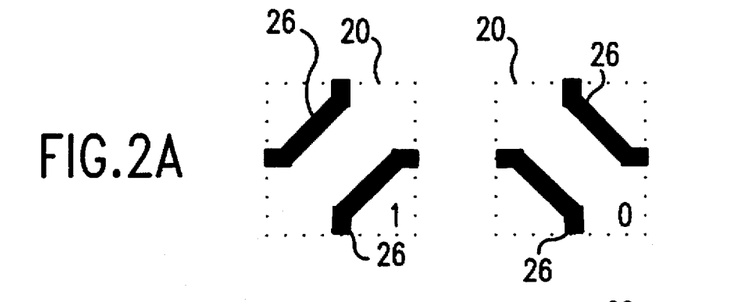
FIGS. 2A, 2B and 2C are views illustrating individual halftone cells according to a preferred embodiment of the present invention.
Figure 2B:
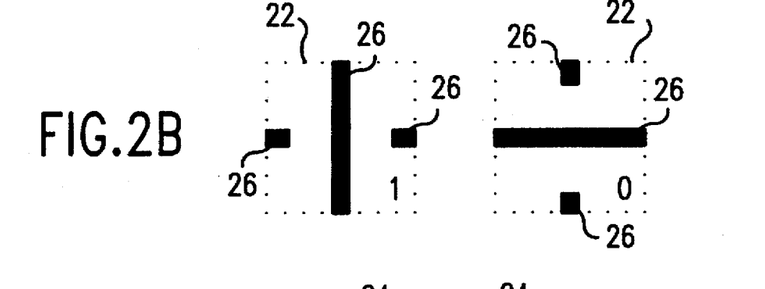
Figure 2C:
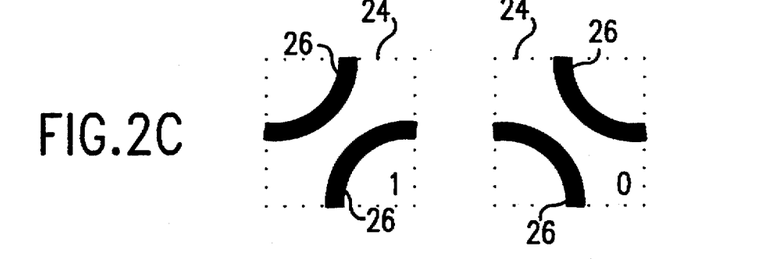

Each of the halftone cells is composed of a two-dimensional array of pixels. For example, FIGS. 2A–2C illustrate halftone cells 20, 22 and 24 produced from dot patterns 26 forming different shapes according to the present invention. The halftone cells 20, 22 and 24 are generally square shaped but may be formed of different even sided, symmetric shapes such as hexagons. End portions of the dot patterns 26 within a halftone cell 20, 22 and 24 intersect at approximately a center portion of the sides of the halftone cell. The halftone cells 20, 22 and 24 shown in FIGS. 2A, 2B and 2C are shown rotated 90 degrees from one another. The rotation of the halftone cells 20, 22 and 24 may be used to encode data within each of the cells, as explained above. Each of the halftone cells 20, 22 and 24 is relatively small. For example, each of the halftone cells 20, 22 and 24 in actual use may have a size of approximately $1/75" \times 1/75"$.

A halftone image is formed according to the present invention by placing a large number of the halftone cells 20, 22 and 24 adjacent to one another. A tone of the halftone image is controlled by selectively varying a thickness of the dot patterns 26 within the halftone cells 20, 22 and 24. Rotation of the halftone cells 20, 22 and 24 does not vary a tone of the halftone image because the dot patterns of one cell connect with the dot patterns 26 of an adjacent cell regardless of how one cell is rotated relative to the adjacent cell. Thus the halftone cells 20, 22 and 24 may be encoded with data without varying the tone of the image.

Figure 3:
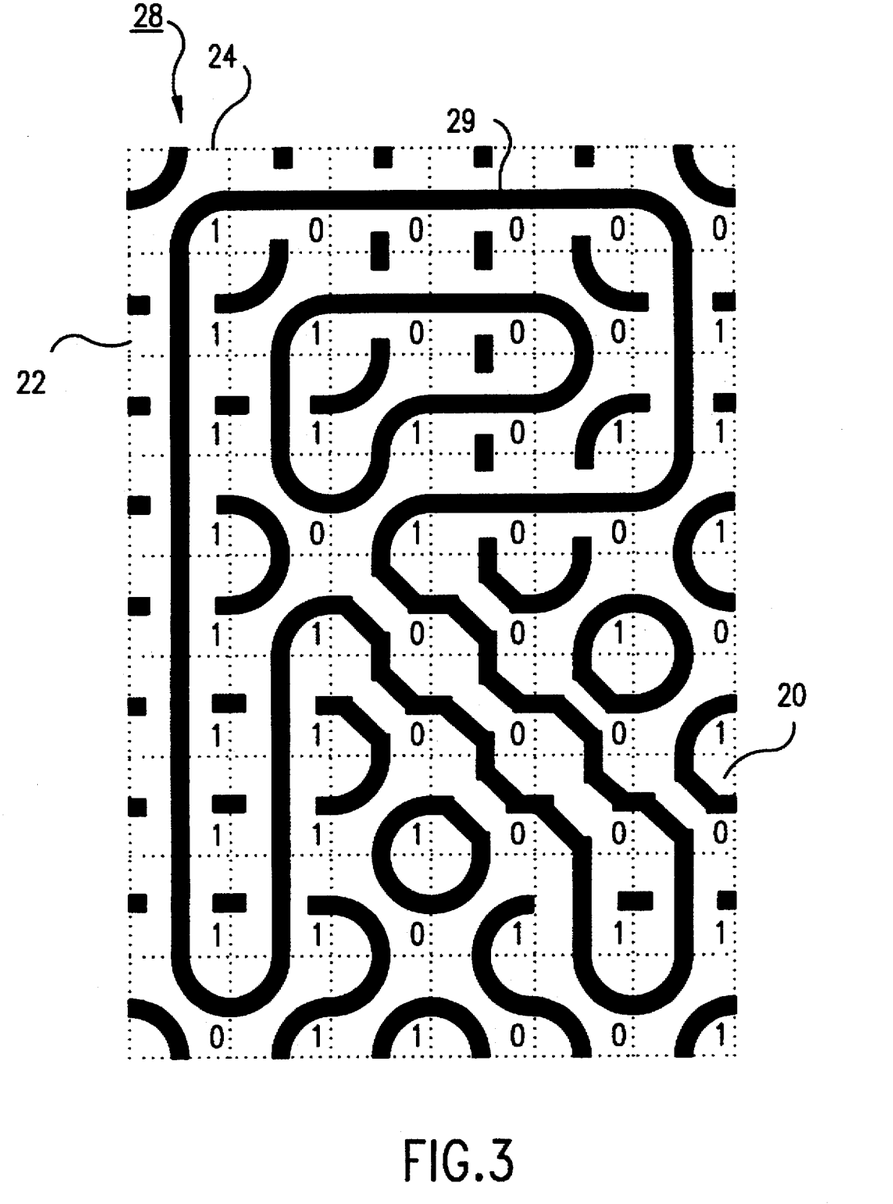
FIG. 3 is an enlarged view of a halftone image produced according to a preferred embodiment of the present invention.

FIG. 3 illustrates an enlarged view of a halftone image 28 generated in accordance with the present invention. The halftone cells 20, 22 and 24 of the halftone image 28 are formed from the dot patterns 26. As previously described, each of the dot patterns 26 intersects a center portion of the halftone cell 20, 22 and 24 within which the dot patterns 26 are formed. The halftone cells 20, 22 and 24 are arranged adjacent to one another to form the halftone image 28. Since the halftone cells 20 are identical near boundaries of the halftone cells, there is no discernible change in tone after 90° rotation of individual ones of the halftone cells.

As shown in FIG. 30 the halftone cells 20, 22 and 24 are arranged within the halftone image 28 so that the shapes of the dot patterns form a human readable pattern 29 within the halftone image 28. The human readable pattern 29 may be text, geometric shapes, patterns, numbers, figures, etc. The human readable pattern 29 shown in FIG. 3 is a letter "R" and is formed from the three types of halftone cells 20, 22 and 24 shown in FIGS. 2A, 2B and 2C. When generating a halftone image having an "R" embedded therein, the bitmap generator 10 inputs bitmap codes based on a pattern input of "R" so that the halftone generator will output the halftone cells 20, 22 and 24 to printer 28.

Each of the halftone cells 20, 22 and 24 shown in FIG. 3 is illustrated with a "1" or "0" shown in the lower righthand corner of the halftone cells 20, 22 and 24. The "1" or "0" are shown for illustration purposes only in FIG. 3 and represent a data value that may be encoded in each of the halftone cells 20. As explained above, the encoded data value is based on rotation of the halftone cells relative to one another. The encoded data is typically read by a machine. Devices such as input scanners can be employed for recovering machine readable encoded data from the image. The encoded data can be employed for various purposes during electronic processing of such documents by electronic document processing systems, such as electronic copiers, text and graphic image processing systems, facsimile systems, electronic mail systems, electronic file systems and document and character recognition equipment. A fuller description of the encoding of data values within the halftone cells is contained in application Ser. No. 08/463,178, which has previously been incorporated herein by reference.

Figure 4:
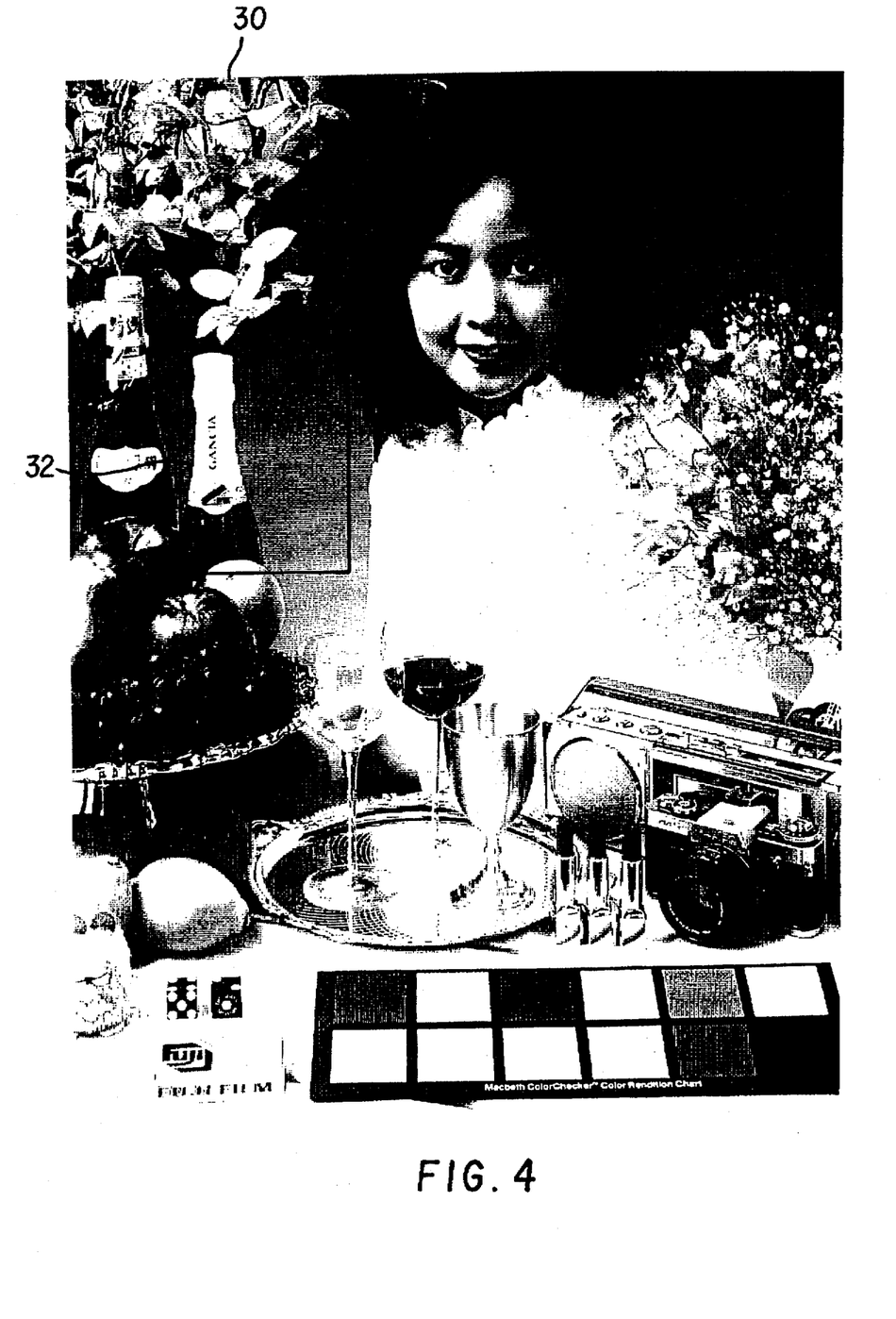
FIG. 4 illustrates a halftone image produced according to a preferred embodiment of the present invention.

FIG. 4 illustrates a halftone image 30 produced according to a preferred embodiment of the present invention. The halftone image 30 is formed from halftone cells 24. Each of the halftone cells 24 is formed from dot patterns 26. As explained above, the tone of various portions of the image 30 is selectively varied by varying a thickness of the dot patterns 26 within individual halftone cells 24.

As explained above, the halftone image 30 contains at least one human readable pattern embedded within the halftone image 30. However, due to the relatively small size of the halftone cells, the human readable pattern may not be visible without the use of a magnifying device.

Figure 5:
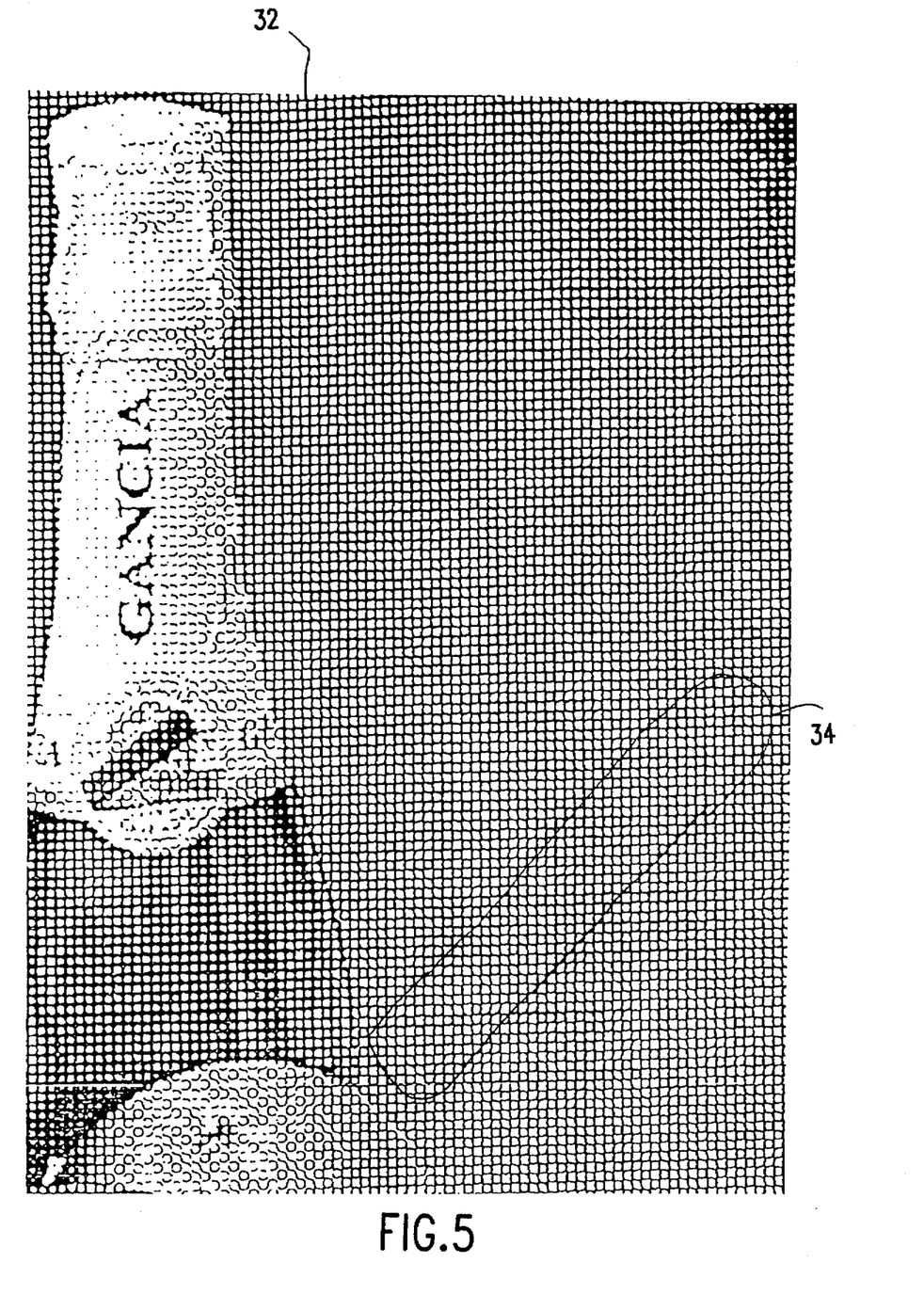
FIG. 5 is a portion of the halftone image of FIG. 4 enlarged to illustrate a human readable pattern embedded within the halftone image.

FIG. 5 illustrates a portion 32 of the halftone image 30 shown in FIG. 4 enlarged to illustrate a human readable pattern formed within the halftone image 30. The human readable pattern is contained in the circled block 34 and in this case the human readable pattern is the word "COMPANY". However, as explained above, the human readable pattern formed within the halftone image 30 may be formed as text, geometric shapes, patterns, numbers, figures, etc.

The halftone image 30 was produced with 75 halftone cells 20 per inch. Due to the relatively small size of the halftone cells, the human readable pattern embedded within the image may be lost in a copy of image 30 if the machine used to make the copy does not have sufficient resolution.

Figure 6:
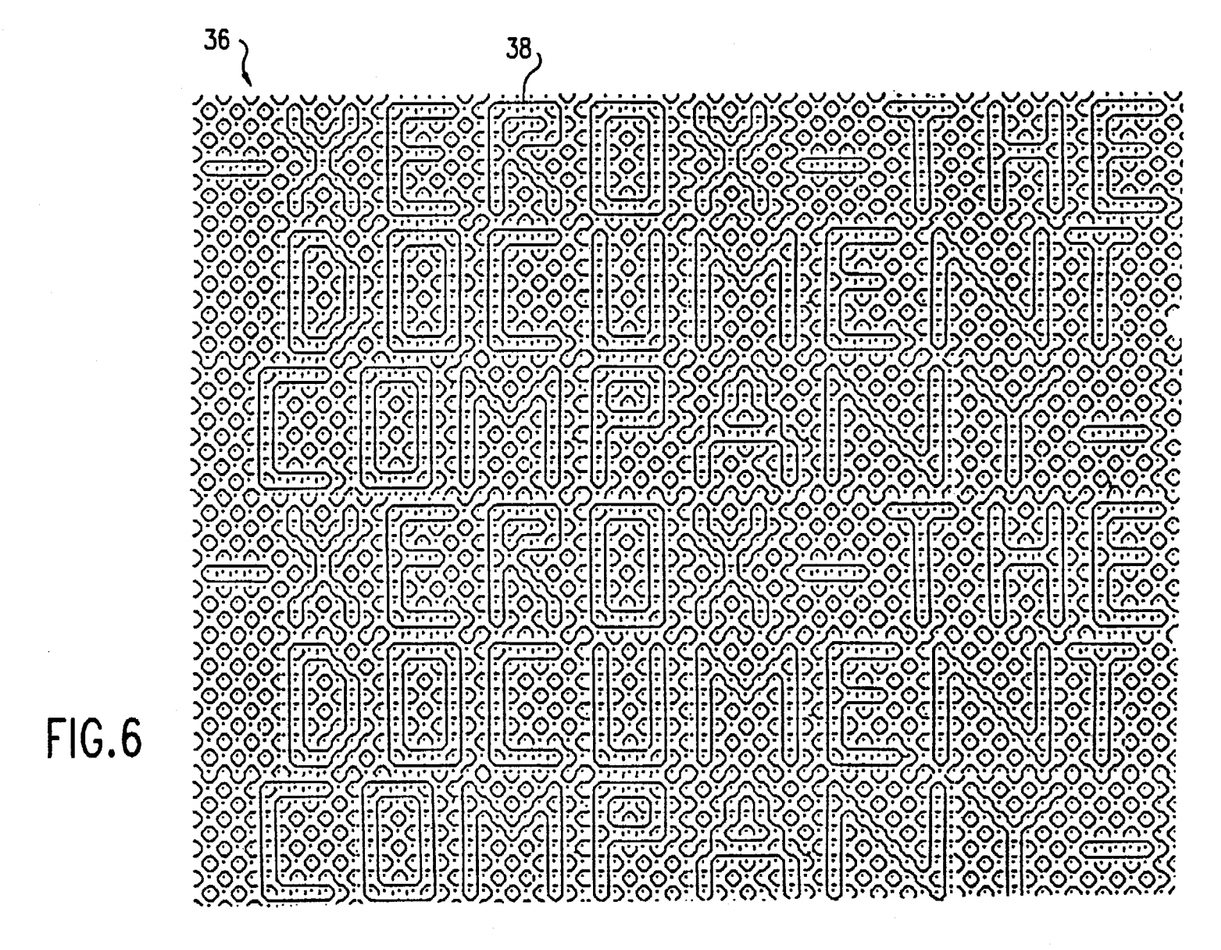
FIG. 6 is a portion of a halftone image enlarged to illustrate a human readable pattern embedded within the halftone image.

FIG. 6 illustrates a portion of a halftone image 36 enlarged to illustrate a human readable pattern formed within the halftone image. The human readable pattern is "-XEROX-THE DOCUMENT COMPANY-".

The human readable pattern illustrated in the portion of the halftone image 36 of FIG. 6 is formed from halftone cells 20, 22 and 24 as illustrated in FIGS. 2A to 2C. The human readable pattern 38 illustrated in FIG. 6 is similar to that illustrated in FIG. 3. In particular, the "R" illustrated within the enlarged portion of the halftone image 36 of FIG. 6 is substantially similar to the "R" illustrated in FIG. 3. However, in comparing the "R" of FIG. 3 with that of FIG. 6, some of the individual halftone cells are changed. For example, the upper left hand corner of the "R" is formed with the halftone cell 20 instead of the halftone cell 24.

The enlarged portion of the halftone image 36 forms a portion of an overall halftone image such as the halftone image 30 illustrated in FIG. 4. In this way, the human readable pattern may be easily encoded within the halftone image.

While this invention has been described in conjunction with a specific embodiments thereof, it is evident that many alternatives, modifications and variations will be apparent to those skilled in the art. Accordingly, the preferred embodiments of this invention, as set forth herein, are intended to be illustrative and not limiting. Various changes may be made without departing from the spirit and scope of the invention as defined in the following claims.

What is claimed is:

1. An apparatus for producing a halftone image, comprising:

a bitmap generator that generates bitmap codes based upon at least one human readable pattern to be formed within the halftone image;

a halftone generator for generating halftone cells from the bitmap codes and from grayscale image data, the halftone cells being formed from dot patterns, the halftone generator selecting one of a plurality of predetermined shapes for the dot patterns of each of the halftone cells; and an output device for writing the halftone cells on a recording medium to produce the halftone image, the halftone image having embedded therein at least one human readable pattern formed by the predetermined shapes of the halftone cells.

2. The apparatus of claim 1, wherein each of the halftone cells has four sides and the dot patterns of each of the halftone cells contact a center portion of each of the four sides.

3. The apparatus of claim 1, wherein the halftone cells each have a plurality of sides, end portions of the dot patterns contact a center portion of each of the sides of the halftone cells and each of the end portions contacts an end portion of the dot patterns of an adjacent one of the halftone cells.

4. The apparatus of claim 1, wherein the halftone generator varies a tone of the image by selectively varying a thickness of the dot patterns within individual ones of the halftone cells.

5. The apparatus of claim 1, further comprising an image generator connected to the halftone generator, wherein the image generator generates the grayscale image data.

6. The apparatus of claim 1, wherein a tone of the halftone image is independent of rotation of each of the halftone cells relative to adjacent halftone cells.

7. The apparatus of claim 1, wherein the human readable pattern is readable by a human only with the use of a magnifying device.

8. The apparatus of claim 1, further comprising encoding means for encoding data within each of the halftone cells.

9. The apparatus of claim 8, wherein the encoding means comprises a pattern rotating device for rotating the halftone cells based on encoding data.

10. A method of generating a halftone image, comprising:

generating bitmap codes based upon at least one human readable pattern to be formed within the halftone image;

generating halftone cells from the bitmap codes and from grayscale image data, the halftone cells being formed from dot patterns, the bitmap codes selecting one of a plurality of predetermined shapes for the dot patterns of each of the halftone cells; and writing the halftone cells on a recording medium to produce the halftone image, the halftone image having embedded therein at least one human readable pattern formed by the predetermined shapes of the halftone cells.

11. The method of claim 10, wherein generating the halftone cells comprises generating halftone cells having four sides with the dot patterns of each of the halftone cells contacting a center portion of each of the four sides.

12. The method of claim 10, wherein generating the halftone cells comprises generating halftone cells having a plurality of sides with end portions of the dot patterns contacting a center portion of each of the sides and each of the end portions contacting an end portion of the dot patterns of an adjacent one of the halftone cells.

13. The method of claim 10, further comprising varying a tone of the image by selectively varying a thickness of the dot patterns within individual ones of the halftone cells.

14. The method of claim 10, further comprising generating the grayscale image data.

15. The method of claim 10, further comprising selectively rotating the halftone cells without affecting a tone of the image.

16. The method of claim 10, further comprising encoding data within each of the halftone cells.

17. The method of claim 16, wherein encoding data within each of the halftone cells comprises selectively rotating the halftone cells based on input encoding data.

18. The method of claim 16, wherein a rotational position of each of the halftone cells determines an encoded data value.

* * * * *